Oct. 17, 1933.     W. C. P. ZABEL     1,931,175
TRAP
Filed Feb. 29, 1932
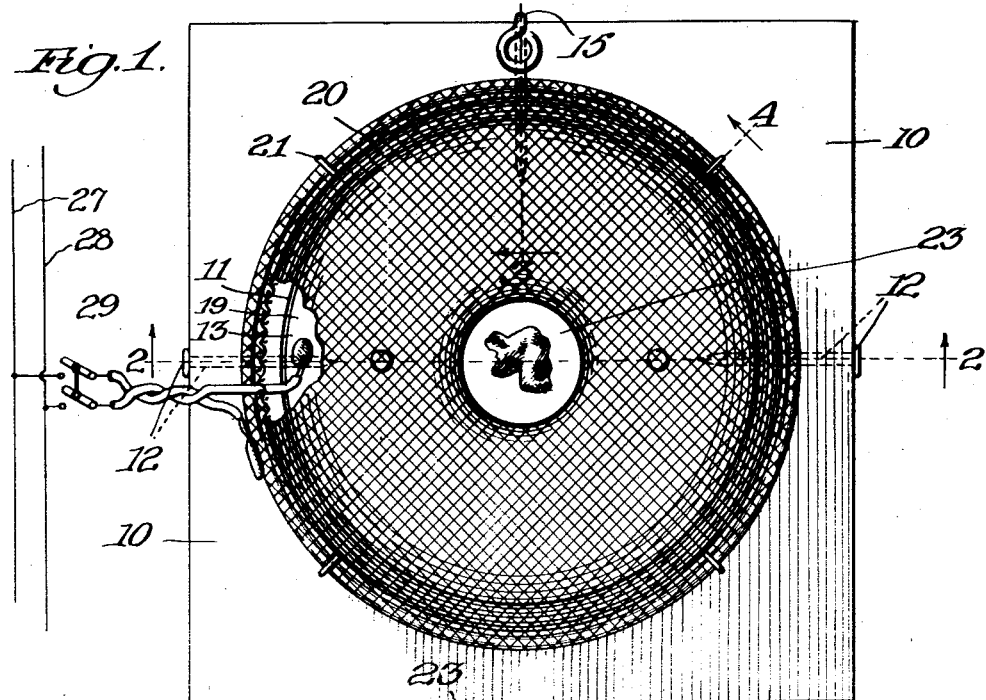

Patented Oct. 17, 1933

1,931,175

UNITED STATES PATENT OFFICE 1,931,175

TRAP

William C. P. Zabel, Chicago, Ill.

Application February 29, 1932
Serial No. 595,877

2 Claims. (Cl. 43—99)

The invention relates to traps and is particularly adapted to be embodied in mouse traps, or the like.

One form of the invention is embodied in a mouse trap which comprises a base having a relatively large aperture extending therethrough and pivoted to the base is a closure member for the aperture, which closure member forms the bottom wall of the trap when it is in its closed position. An inverted cup-shaped member formed of wire mesh is mounted on the base over the aperture and is itself provided with a relatively large aperture through which mice may enter the enclosure formed by the wire mesh. The upper surface of the closure member is covered with a plate of metal. The wire mesh and the metallic plate are connected to any suitable source of electrical energy, the construction being such that when a mouse enters the trap and comes into contact with both the mesh and the wire plate it will be electrocuted. The metallic plate is smaller in diameter than the diameter of the enclosure formed by the wire mesh. This insures that when a mouse is electrocuted, it will not fall in such a position that it will continue to close the circuit between the mesh and the metallic plate.

Other objects and advantages will become apparent as the following detailed description progresses, reference being had to the accompanying drawing, wherein Figure 1 is a plan view of a mouse trap which embodies the invention, the electrical circuit for the trap being shown diagrammatically.

Fig. 2 is a section taken on line 2—2 of Fig. 1.

Fig. 3 is a section taken on line 3—3 of Fig. 1 and

Fig. 4 is a section taken on line 4—4 of Fig. 1.

Referring to the drawing wherein a preferred embodiment of the invention is illustrated, the reference character 10 designates a board or base which is provided with a relatively large central aperture 11. (Fig. 2). Pivoted to the board 10 by pins 12 is a disc 13 which is preferably formed of wood or any suitable electrical insulation. It will be noted that the disc 13 forms a closure member for the aperture 11. The closure member may be secured in its closed position by a latch member 15 slidably journaled in a hole 16 formed in the base 10, the inner end of the latch member 15 being adapted to engage a hole 17 provided in the edge of the disc 13. (Fig. 3). The upper surface of the disc 13 is covered by a disc 19 formed of sheet metal.

An inverted cup-shaped member 20 formed of wire mesh is mounted on the board 10 and is secured thereto by staples 21, or the equivalent. The member 20 co-operates with the board 10 to form an enclosure to which access may be had through the aperture 11 or through an opening 23 provided in the top wall of the member 20. The opening 23 is formed by turning in a portion of the wire mesh so that a downwardly extending flange 25 is provided. The wires protruding from the lower end of the flange 25 prevent a mouse from escaping from the trap after it has once entered the trap.

Any suitable means may be provided for connecting the trap to a source of electrical energy. In this instance, the trap is operatively connected to a pair of mains 27 and 28 through a switch 29. Suitable conductors connect the metallic disc 19 to one of the mains and connect the wire mesh 20 to the other of the mains.

The operation of the above described device is substantially as follows: bait is placed within the trap to attract the mice. When a mouse enters the trap it will, as it moves about, come into contact with both the metallic discs 19 and the wire mesh 20 whereupon it will be electrocuted. The mouse will fall upon the disc 19 and as has been found in practice, will generally fall in such a position that it will not continue to short circuit the electrical circuit. However, if some portion of the mouse engages the wire mesh, it will simply burn until the circuit is broken.

The construction described above is advantageous as it is virtually impossible to fall into a position wherein it will form a permanent short circuit after it has been electrocuted.

Electrocuted mice may be removed from the trap by unlatching the disc 13 so that its contents may fall out of it.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as possible, in view of the prior art.

I claim:

1. A trap comprising a base formed of electrical insulation, said base having a relatively large opening therethrough, an inverted cup-shaped member formed of wire mesh and mounted on said base, means including a metallic plate forming a closure member for the opening in said base, and pivoted therein, said metallic plate being spaced from said cup-shaped member, and means for connecting said cup-shaped member and said metallic plate to an electrical circuit whereby said cup-shaped member becomes one terminal of said circuit and said metallic plate becomes the other terminal thereof.

2. A trap comprising an apertured base formed from electrical insulation, a housing member mounted on said base over the aperture therein, said housing member being provided with an opening, a closure member including a metallic plate pivoted in said aperture, means for retaining said closure member in closed position, and means for connecting said housing member and said metallic plate to an electrical circuit whereby said housing member becomes one terminal of said circuit and said metallic plate becomes the other terminal thereof.

WILLIAM C. P. ZABEL.